US010926402B2

(12) United States Patent
Shafer et al.

(10) Patent No.: US 10,926,402 B2
(45) Date of Patent: Feb. 23, 2021

(54) ROBOTIC ARM ASSEMBLIES WITH UNIDIRECTIONAL DRIVE ACTUATORS

(71) Applicant: X Development LLC, Mountain View, CA (US)

(72) Inventors: Alex Shafer, San Francisco, CA (US); Bruce Schena, Menlo Park, CA (US); Mitchell Barham, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 308 days.

(21) Appl. No.: 15/851,606

(22) Filed: Dec. 21, 2017

(65) Prior Publication Data

US 2019/0184551 A1 Jun. 20, 2019

Related U.S. Application Data

(60) Provisional application No. 62/607,608, filed on Dec. 19, 2017.

(51) Int. Cl.
*B25J 9/04* (2006.01)
*B25J 9/10* (2006.01)
*B25J 9/12* (2006.01)
*F16H 1/28* (2006.01)
*F16D 13/52* (2006.01)

(52) U.S. Cl.
CPC .............. *B25J 9/046* (2013.01); *B25J 9/102* (2013.01); *B25J 9/126* (2013.01); *F16D 13/52* (2013.01); *F16H 1/28* (2013.01); *Y10S 901/15* (2013.01); *Y10S 901/23* (2013.01)

(58) Field of Classification Search
None
See application file for complete search history.

(56) References Cited

U.S. PATENT DOCUMENTS

| | | | |
|---|---|---|---|
| 9,566,715 B2* | 2/2017 | Kermani | ................. B25J 19/06 |
| 10,179,643 B2* | 1/2019 | Nfonguem | ............. B64C 13/36 |
| 2003/0010148 A1* | 1/2003 | Okamoto et al. | .... B25J 17/0291 |
| | | | 74/490.05 |

(Continued)

FOREIGN PATENT DOCUMENTS

| | | |
|---|---|---|
| JP | 2008057566 | 3/2008 |
| WO | 2016/134472 | 9/2016 |
| WO | 2017/185176 | 11/2017 |

OTHER PUBLICATIONS

International Searching Authoring, International Search Report and Written Opinion dated Apr. 1, 2019, issued in connection with International Patent Application No. PCT/US2018/064722, filed on Dec. 10, 2018, 17 pages.

*Primary Examiner* — William Kelleher
*Assistant Examiner* — Gregory T Prather
(74) *Attorney, Agent, or Firm* — McDonnell Boehnen Hulbert & Berghoff LLP

(57) ABSTRACT

A robotic arm system is provided. The system includes a one or more roll and/or angle actuators driven by a unidirectional drive. One or more clutches allow the actuators to engage and disengage with a drive shaft or a reverser assembly or angle drive coupled to the drive shaft, thereby permitting changes in rotational direction for the actuators without a change in the rotational direction of the drive.

13 Claims, 11 Drawing Sheets

(56) References Cited

U.S. PATENT DOCUMENTS

| | | | |
|---|---|---|---|
| 2003/0220169 A1* | 11/2003 | Norman | B25J 9/102 475/331 |
| 2010/0312363 A1* | 12/2010 | Herr | A61F 2/64 623/39 |
| 2013/0047772 A1* | 2/2013 | Shafer | B25J 19/06 74/490.03 |
| 2014/0128849 A1* | 5/2014 | Au | A61B 17/00 606/1 |
| 2015/0005940 A1* | 1/2015 | Ichibangase | B25J 9/102 700/258 |
| 2015/0107395 A1* | 4/2015 | Kermani | B25J 19/06 74/490.03 |
| 2016/0355253 A1* | 12/2016 | Nfonguem | F16D 37/008 |
| 2017/0266806 A1* | 9/2017 | Radin | B25J 9/102 |
| 2017/0356506 A1* | 12/2017 | Takada | B25J 19/0029 |
| 2018/0029225 A1* | 2/2018 | Plante | B25J 9/104 |
| 2018/0303636 A1* | 10/2018 | Pomeroy | A61F 2/64 |
| 2019/0128340 A1* | 5/2019 | Denninger | B25J 13/085 |
| 2019/0269388 A1* | 9/2019 | Au | A61B 17/00 |
| 2019/0299429 A1* | 10/2019 | Hamada | B25J 9/1633 |

* cited by examiner

ROBOTIC ARM ASSEMBLIES WITH UNIDIRECTIONAL DRIVE ACTUATORS

CROSS REFERENCE TO RELATED APPLICATION

This application claims priority to U.S. Provisional Patent Application No. 62/607,608 filed Dec. 19, 2017.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various links or appendages that are designed to aid interaction with the environment, and those robotic links or appendages may include one or more actuators that allow movement through multiple Degrees of Freedom (DOFs). Such components may allow a robotic device to effectively carry out one or more actions.

SUMMARY

The present application discloses implementations that relate to one or more rotating roll and/or right-angle joints driven by a single unidirectional drive. The implementations aid achievement of safe, high performance, robust human-level manipulation and motion with actuators that exhibit near ideal characteristics, i.e., low or zero inertia/compliance/backlash, high dynamic range, and a have a low mass.

In one example, the present application describes a robotic arm system. The robotic arm system includes a primary drive shaft with a first end and a second end. A drive motor is coupled to the primary drive shaft, and the drive motor is configured to rotate the primary drive shaft in a first direction. The robotic arm system further includes a first link with a first portion and a second portion. A first roll actuator is coupled to the first link and the primary drive shaft, and the first roll actuator is configured to: (i) releasably engage the primary drive shaft and, when engaged, rotate the first portion of the first link in the first direction, and, (ii) releasably engage the primary drive shaft and, when engaged, rotate the first portion of the first link opposite the first direction. The robotic arm system also includes a second link and a first angular actuator. The first angle actuator is coupled to the first link, the second link, and the first end of the primary drive shaft. The first angular actuator is configured to: (i) releasably engage the primary drive shaft and, when engaged, rotate the second link in a second direction, and (ii) releasably engage the primary drive shaft and, when engaged, rotate the second link opposite the second direction.

In another example, another robotic arm system is described. The robotic arm system includes a primary drive shaft and a drive motor coupled to the primary drive shaft. The drive motor is configured to rotate the primary drive shaft in a first direction. The robotic arm system further includes a first link with a first portion and a second portion. A roll actuator is coupled to the first link and the primary drive shaft, and the roll actuator is configured to: (i) releasably engage the primary drive shaft and, when engaged, rotate the first portion of the first link in the first direction, and, (ii) releasably engage the primary drive shaft and, when engaged, rotate the first portion of the first link opposite the first direction.

In another example, another robotic arm system is described. The robotic arm system includes a primary drive shaft with a first end and a second end. The robotic arm system further includes a drive motor coupled to the primary drive shaft, and the drive motor is configured to rotate the primary drive shaft in a first direction. The robotic arm system additionally includes a first link, a second link, and an angular actuator. The angular actuator is coupled to the first link, the second link, and the first end of the primary drive shaft. The angular actuator is configured to: (i) releasably engage the primary drive shaft and, when engaged, rotate the second link in a second direction, and (ii) releasably engage the primary drive shaft and, when engaged, rotate the second link opposite the second direction.

In another example, a method of rotating a robotic arm roll joint is described. A step of the method includes rotating a drive shaft in a first direction via a drive motor. Another step of the method includes engaging a first clutch in a roll actuator. The first clutch rotationally couples a first portion of a robotic link to the drive shaft, thereby causing relative rotation between the first portion of the robotic link and a second portion of the robotic link in a second direction. Another step of the method includes disengaging the first clutch in the roll actuator, thereby ceasing the relative rotation in the second direction. Another step of the method includes engaging a second clutch in the roll actuator. The second clutch rotationally couples a first portion of the robotic link to the drive shaft via a reversing assembly, thereby causing relative rotation between the first portion of the robotic link and a second portion of the robotic link opposite the second direction.

In another example, a method of rotating a robotic arm right-angle joint is described. A step of the method includes rotating a drive shaft in a first direction via a drive motor. Another step of the method includes engaging a first clutch in an angle actuator. The angle actuator is coupled to a first robotic link and a second robotic link, and the first clutch rotationally couples the second link to the drive shaft via a first angle drive, thereby causing relative rotation between the first link and the second link in a second direction. The second direction is at an angle to the first direction. Another step of the method includes disengaging the first clutch in the angle actuator, thereby ceasing the relative rotation in the second direction. Another step of the method includes engaging a second clutch in an angle actuator. The second clutch rotationally couples the second link to the drive shaft via a second angle drive, thereby causing relative rotation between the first link and the second link opposite the second direction.

In another example, a robotic arm device is described. The robotic arm device includes a robotic link with a first portion and a second portion. The robotic arm device further includes a drive motor configured to rotate a drive shaft, and also includes a roll actuator that includes a first clutch configured to releasably couple the first portion of the robotic link to the drive shaft, and a second clutch configured to releasably couple the first portion of the robotic link to the drive shaft via a reverser assembly. The robotic arm device additionally includes a control system configured to control the robotic gripping device. The control system includes one or more processors, a non-transitory computer-readable memory, and program instructions stored on the non-transitory computer-readable memory. The program instructions are executable by the one or more processors to: (i) cause the drive motor to rotate the drive shaft in a first direction, (ii) cause the first clutch to engage, thereby causing relative rotation between the first portion of the robotic link and a second portion of the robotic link in a second direction, (iii) cause the first clutch to disengage, thereby ceasing the relative rotation in the second direction, and (iv) cause the second clutch to engage, thereby causing relative rotation between the first portion of the robotic link and a second portion of the robotic link opposite the second direction.

In another example, another robotic arm device is described. The robotic arm device includes a first robotic link and a second robotic link rotatable at an angle relative to the first robotic link. The robotic arm device further includes a drive motor configured to rotate a drive shaft, and also includes an angle actuator that includes a first clutch configured to releasably couple the second link to the drive shaft via a first angle drive, and a second clutch configured to releasably couple the second link to the drive shaft via a second angle drive. The robotic arm device additionally includes a control system configured to control the robotic gripping device. The control system includes one or more processors, a non-transitory computer-readable memory, and program instructions stored on the non-transitory computer-readable memory. The program instructions are executable by the one or more processors to: (i) cause the drive motor to rotate the drive shaft in a first direction, (ii) cause the first clutch to engage, thereby causing relative rotation between the first link and the second link in a second direction at an angle to the first direction, (iii) cause the first clutch to disengage, thereby ceasing the relative rotation in the second direction, and (iv) cause the first clutch to engage, thereby causing relative rotation between the first portion of the robotic link and a second portion of the robotic link opposite the second direction.

In another example, a roll actuator is described. The roll actuator includes a reverser assembly coupled to an input shaft. The input shaft is configured for rotary motion in a rotation direction. The reverser assembly includes a rotary output, and is configured such that the rotary output rotates in a direction opposite the rotation direction of the input shaft. The roll actuator further includes a first clutch assembly coupled to a robotic link. The first clutch assembly is configured to releasably engage the input shaft and rotate the robotic link in the rotation direction of the input shaft. The roll actuator also includes a second clutch assembly coupled to the robotic link. The second clutch assembly is configured to releasably engage the rotary output and rotate the robotic link opposite the rotation direction of the input shaft.

In another example, an angle actuator is described. The angle actuator includes a pinion gear configured for rotary motion in a first rotation direction. The pinion gear is coupled to an external input shaft and a first face gear is engaged with the pinion gear. The angle actuator further includes a second face gear arranged opposite the first face gear and engaged with the pinion gear. The pinion gear is configured to rotate the second face gear in an opposing direction to the first face gear. The angle actuator also includes a first clutch assembly coupled to a robotic link. The first clutch assembly is configured to releasably engage the first face gear and rotate the robotic link in a second rotation direction. The angle actuator additionally includes a second clutch assembly coupled to the robotic link. The second clutch assembly is configured to releasably engage the second face gear and rotate the robotic link opposite the second rotation direction.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompa-

I. OVERVIEW

The examples disclosed herein include one or more combinations of antagonistic clutches, reverser mechanisms, and angular drives serially coupled to a motor and/or gearbox, providing actuation of one or more joints with very low or zero reflected inertia, compliance, and backlash.

One example embodiment includes a roll actuator that may employ two clutches and a reverser assembly to accept unidirectional rotary input in order to rotate a roll joint bi-directionally. By selectively engaging either of the clutches, the direction of the roll joint rotation can be selected or changed without issues of backlash resulting from reversal of the input shaft rotation direction.

In another example embodiment, an angle actuator may employ two clutches and two opposing angle drives to accept unidirectional rotary input in order to rotate a right-angle joint bi-directionally. Similarly to above, the clutches can be selectively engaged to select or change the right-angle rotation without introducing backlash.

In another example embodiment, multiple roll and/or angle actuators may be ganged together by passing torque from a single motor through the actuators. This allows a single unidirectional motor to drive multiple joints without introducing backlash. Other variations are possible as well.

II. EXAMPLE ROBOTIC SYSTEMS

Figure 6:
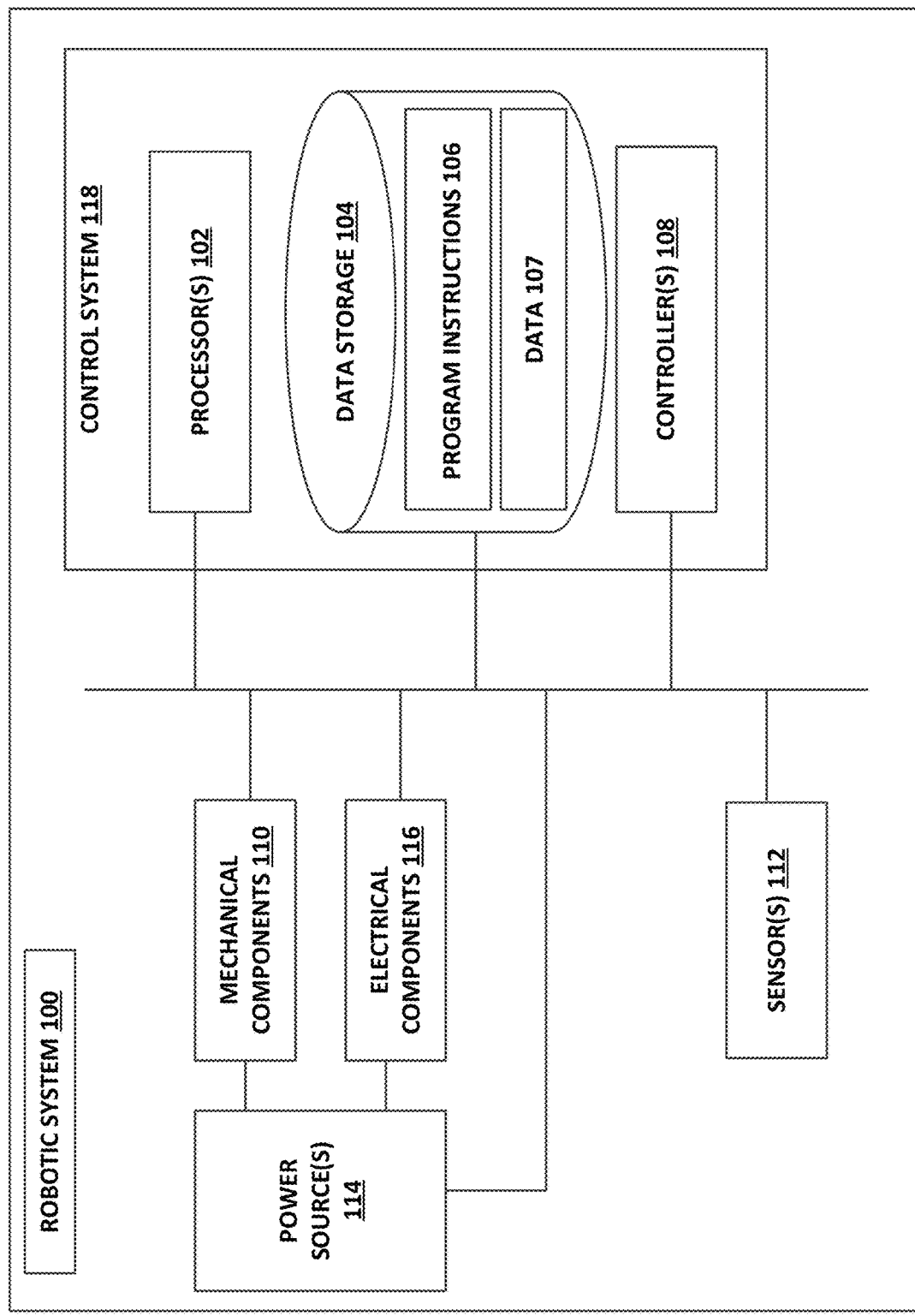
FIG. 6 illustrates a configuration of a robotic system, according to an example implementation.

Referring first to FIG. 6, robotic system 100 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 6, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuator(s), clutch(es), and/or piston(s) arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 6, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 1:
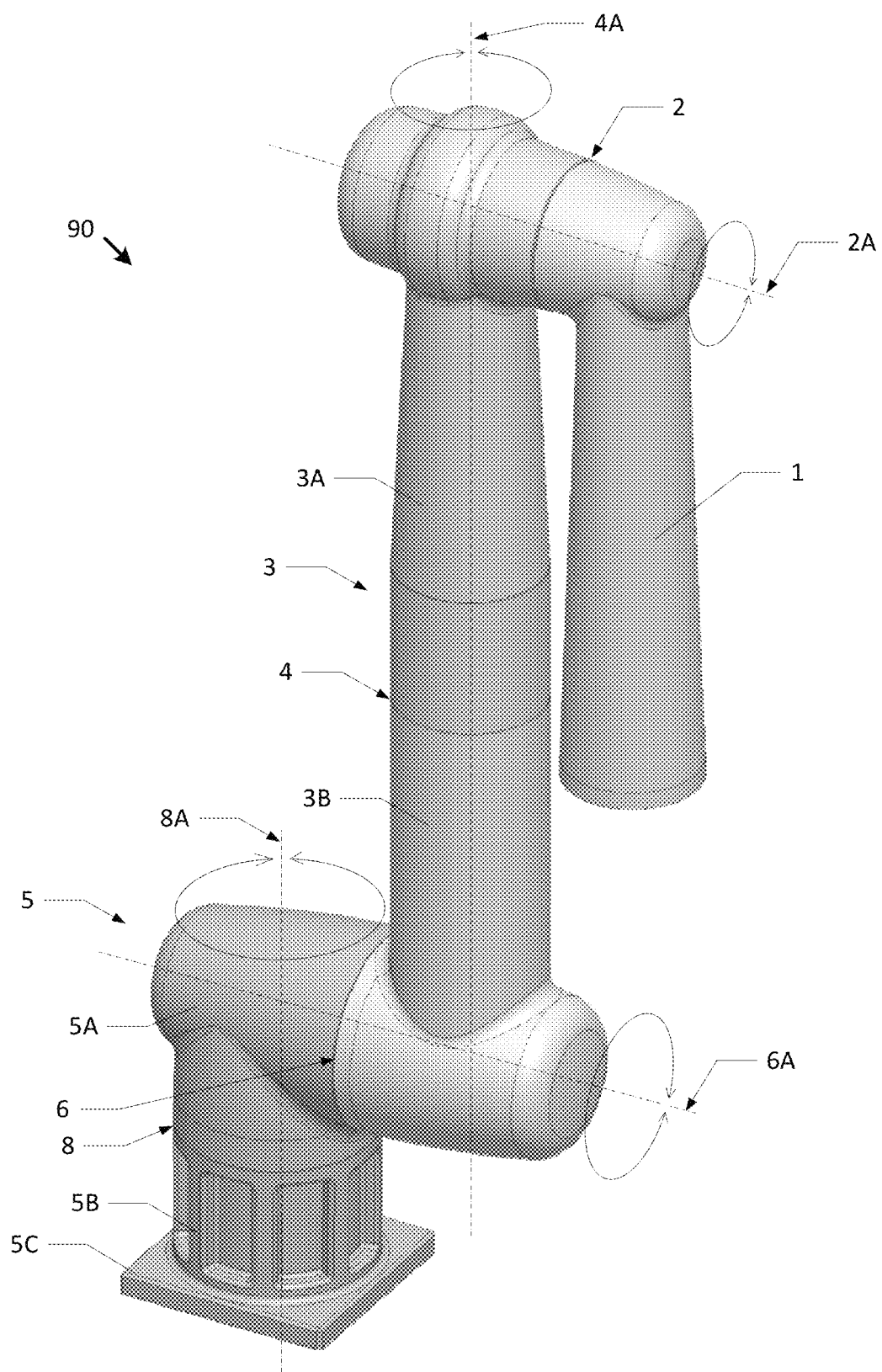
FIG. 1 illustrates an example robotic arm system, according to an example implementation.

Referring now to FIG. 1, FIG. 1 shows an example 4-DOF robotic arm system 90. As shown, the robotic arm system 90 includes a base 5C, which may be a stationary base or may be a movable base. In the case of a movable base, the base 5C may be considered as one of the mechanical components 110 and may include wheels (not shown), powered by one or more actuators, which allow for mobility of the entire robotic arm system 90.

The robotic arm system 90 additionally includes roll joints 4, 8 and right-angle joints 2, 6, each coupled to one or more actuators. The actuators in joints 2, 4, 6, 8 may operate to cause movement of various mechanical components 110 such as robotic links 1, 3, 5 and/or one or more end effectors (not shown). For example, the actuator at joint 2 may cause movement of link 1 relative to link 3 about axis 2A, i.e., at a right angle to link 3. In another example, the actuator at joint 4 may move a rotatable portion 3A of link 3 relative to a fixed portion 3B of link 3 about the common axis 4A. In another example, the actuator at joint 6 may cause movement of link 3 relative to link 5 about axis 6A, i.e., at a right angle to link 5. In another example, the actuator at joint 8 may move a rotatable portion 5A of link 5 relative to a fixed portion 5B of link 5 about the common axis 8A.

In an example implementation, a robotic system 100, such as robotic arm system 90, may be capable of operating in a teach mode. In particular, teach mode may be an operating mode of the robotic arm system 90 that allows a user to physically interact with and guide the robotic arm system 90 towards carrying out and recording various movements. In a teaching mode, an external force is applied (e.g., by the user) to the robotic system 100 based on a teaching input that is intended to teach the robotic system regarding how to carry out a specific task. The robotic arm system 90 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode, the user may grasp onto any part of the robotic arm system 90 and provide an external force by physically moving the robotic arm system 90. In particular, the user may guide the robotic arm system 90 towards grasping onto an object and then moving the object from a first location to a second location. As the user guides the robotic arm system 90 during teach mode, the system may obtain and record data related to the movement such that the robotic arm system 90 may be configured to independently carry out the task at a future time during independent operation (e.g., when the robotic arm system 90 operates independently outside of teach mode). Note, however, that external forces may also be applied by other entities in the physical workspace such as by other objects, machines, and/or robotic systems, among other possibilities.

III. EXAMPLE ROBOTIC ASSEMBLIES WITH UNIDIRECTIONAL DRIVE ACTUATORS

Figure 2:
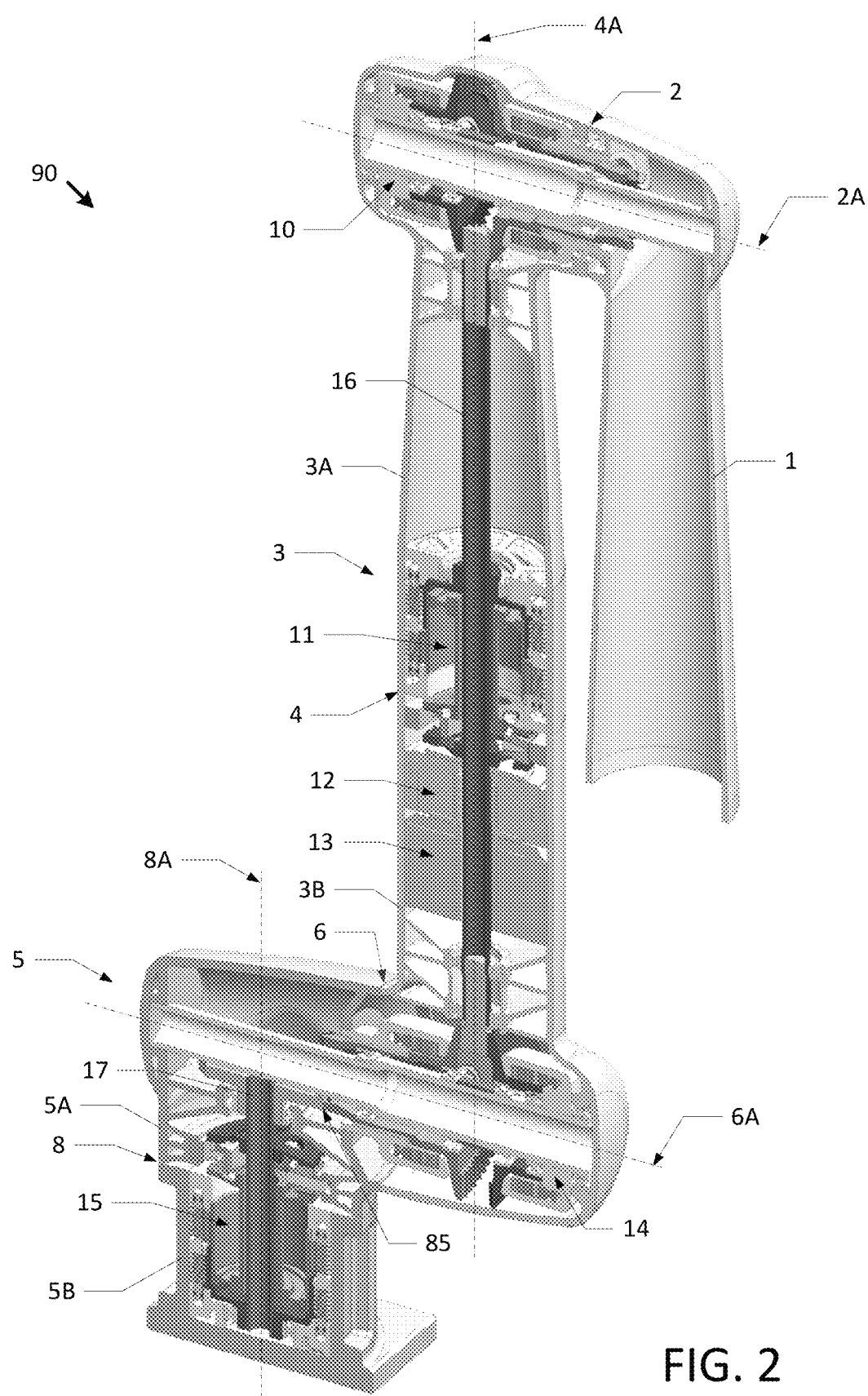
FIG. 2 illustrates a cutaway view of the example robotic arm system in FIG. 1, according to an example implementation.

As noted above, the present disclosure includes implementations that relate to robotic assemblies with a unidirectional drive. FIG. 2 illustrates a simplified example of one embodiment of the present disclosure, as implemented in robotic arm system 90. In FIG. 2, a motor 13 rotates a primary drive shaft 16 (alternatively referred to as an output shaft or an input shaft, depending on context and/or arrangement). Primary drive shaft 16 is illustrated as hollow, but in another embodiment may be solid or otherwise configured. In the example embodiment, the motor 13 drives the primary drive shaft 16 via a reduction gearbox 12 and the primary drive shaft 16 passes completely through roll actuator 11. Preferably, the reduction gearbox 12 is a planetary gearbox. In another embodiment, the motor 13 may directly drive the primary drive shaft 16, or may drive the primary drive shaft 16 via another type of transmission. In the robotic system 90, the motor 13 may rotate the primary drive shaft 16 continuously and in a single direction. The selective actuation of the links 1, 3, and/or 5 does not require that the motor 13 or primary drive shaft 16 stop or change direction, even though the selective actuation of links 1, 3, and/or 5 may each be in either of two directions.

Roll actuator 11 is located within and grounded to link 3, and may releasably engage primary drive shaft 16. Example roll actuator 11 is described further with respect to FIGS. 3A and 3B. Other examples of roll actuators are also possible in this system. In one example, roll actuator 11 may engage primary drive shaft 16, causing torque to transfer from the primary drive shaft 16 to rotatable portion 3A, thereby causing the rotatable portion 3A to rotate relative to the fixed portion 3B and in the same rotational direction as primary drive shaft 16. In another example, roll actuator 11 may engage primary drive shaft 16 via a reverser assembly and cause the rotatable portion 3A to rotate relative to the fixed portion 3B, but in the opposite rotational direction as primary drive shaft 16. Additionally, the roll actuator 11 may also disengage the torque transfer connection between the primary drive shaft 16 and the link 3, thereby stopping the rotation of the rotatable portion 3A with respect to the fixed portion 3B.

In example robotic arm system 90, the primary drive shaft 16 continues to angle actuator 10, which is depicted here as a right-angle actuator, though other examples are possible in this system. Angle actuator 10 is coupled to an end of the primary drive shaft 16, and is further connected to both link 3 and link 1. In one example, angle actuator 10 may engage primary drive shaft 16, causing torque to transfer from the primary drive shaft 16 to the link 1, thereby causing the link 1 to rotate relative to the link 3 and about axis 2A in a first rotational direction, and at a perpendicular angle to primary drive shaft 16 and axis 4A. In another example, angle actuator 10 may engage primary drive shaft 16 and cause the link 1 to rotate relative to the link 3 and about axis 2A, but opposite the first rotational direction. Additionally, the angle actuator 10 may also disengage the torque transfer connection between the primary drive shaft 16 and link 1, thereby stopping the rotation of the link 1 with respect to the link 3.

Similarly as with angle actuator 10, primary drive shaft 16 is also coupled to angle actuator 14 at another end of the primary drive shaft 16. Angle actuator 14 is again depicted as a right-angle actuator, but other examples are possible in other embodiments. As depicted, angle actuator 14 connects and actuates link 3 relative to link 5, in the same manner as described above with respect to angle actuator 10 and links 1 and 3.

In the example embodiment shown in robotic arm system 90, the torque transfer from primary drive shaft 16 continues through angle actuator 14 to secondary drive shaft 17, via an angle drive 85. (Angle actuator 10 may also be connected to a secondary drive shaft via an angle drive, though no such connection is shown in this simplified illustration.) Secondary drive shaft 17 may also be referred to as an output or input shaft, depending on context and/or arrangement. Secondary drive shaft 17 couples to roll actuator 15. As depicted, roll actuator 15 actuates rotatable portion 5A relative to fixed portion 5B, in the same manner as described with respect to roll actuator 11 and link 3.

Robotic arm system 90 may also include a control system such as control system 118 in FIG. 6, which may control one or more aspects of robotic arm system 90. The control system may include one or more processors, and may also include a non-transitory computer-readable memory, which may have stored thereon instructions executable by the one or more processors to carry out one or more actions described in this disclosure. In some examples, the control system may determine to rotate the primary drive shaft 16 via the motor 13 and/or actuate one or joints 2, 4, 6, and/or 8 via actuators 10, 11, 14, and/or 15, respectively, in either rotation direction available to the actuators.

IV. EXAMPLE ROBOTIC ASSEMBLIES WITH UNIDIRECTIONAL DRIVE ACTUATORS

Figure 3A:
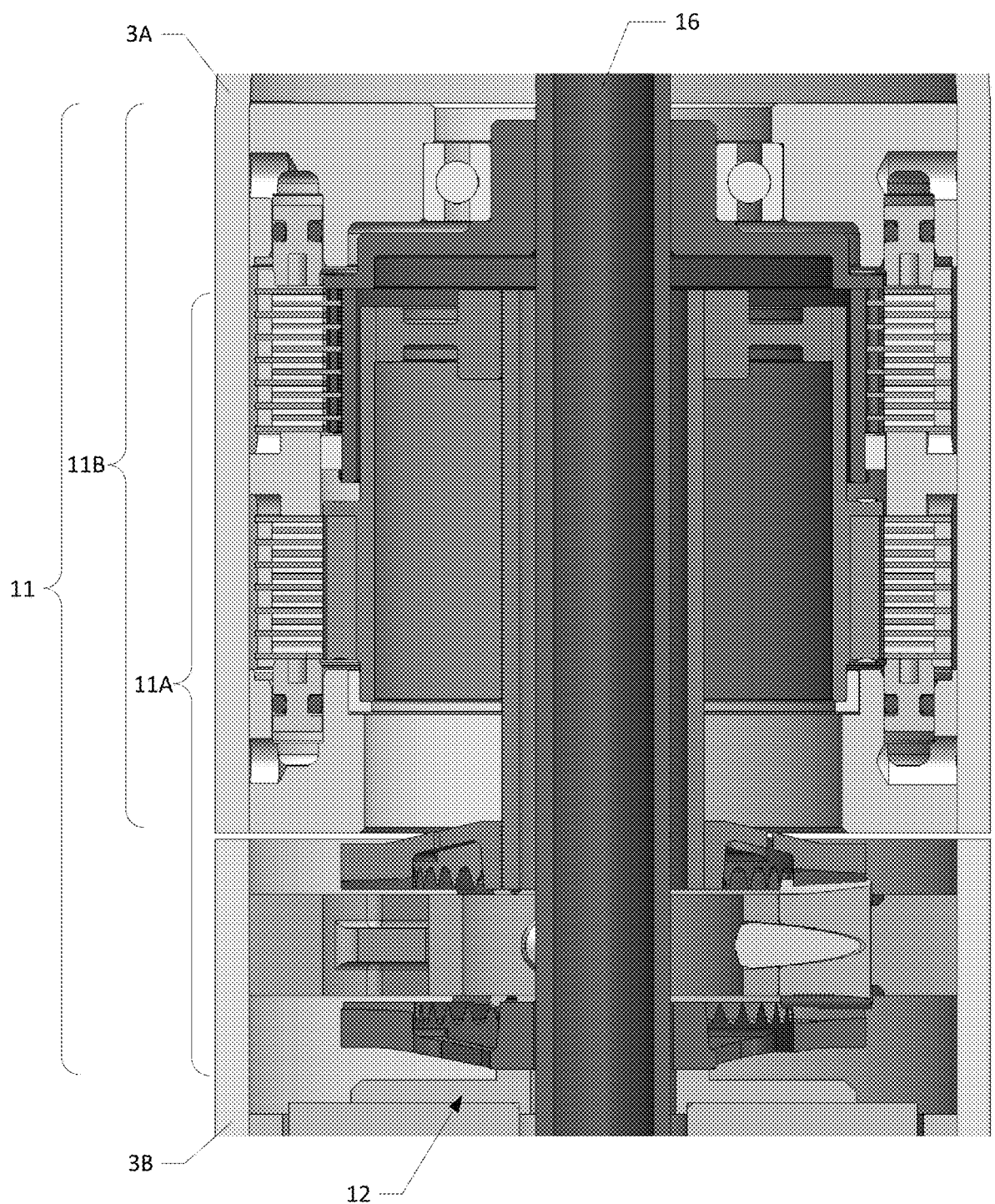
FIG. 3A illustrates a front cutaway detail view of a roll actuator in the example robotic arm system in FIG. 1, according to an example implementation.
Figure 3B:
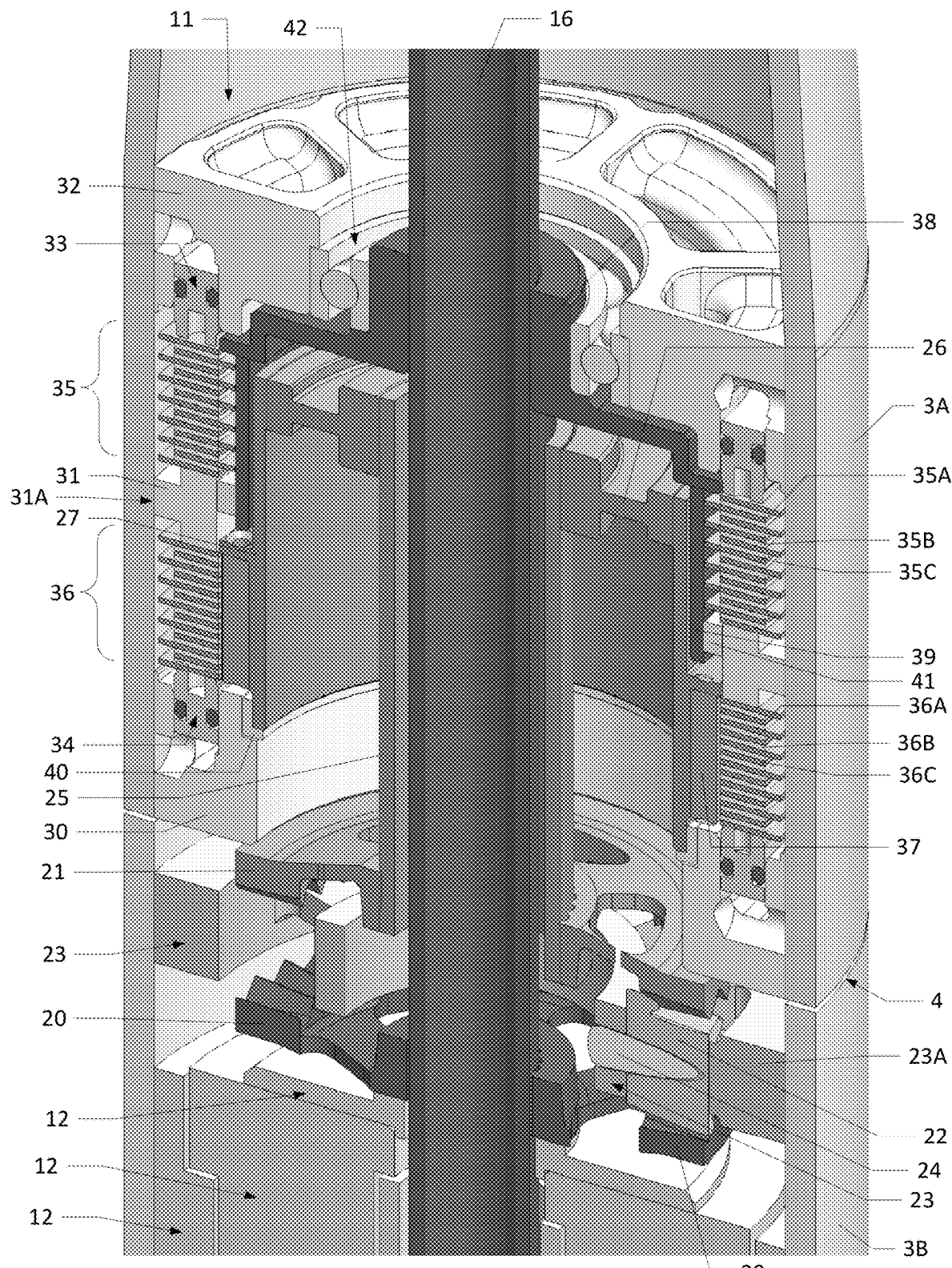
FIG. 3B illustrates a perspective cutaway detail view of the roll actuator in FIG. 3A, according to an example implementation.

FIGS. 3A and 3B illustrate an example roll actuator 11, which may be substantially the same or different than roll actuator 15, and which may be implemented in a robotic arm system, such as robotic arm system 90.

Roll actuator 11 includes a reverser assembly 11A. Reverser assembly 11A supplies a rotational torque from the primary drive shaft 16 to the roll actuator 11 in the opposite direction that the primary drive shaft 16 rotates.

Roll actuator further includes actuator assemblies 11B. The actuator assemblies 11B are capable of releasably engaging the primary drive shaft 16, either directly or through the reverser assembly 11A, and transferring rotational torque from the primary drive shaft 16 to the link 3, thereby rotating the rotatable portion 3A relative to the fixed portion 3B.

Reverser assembly 11A, as illustrated, includes face gear (+) 20 and face gear (−) 21. The designations (+) and (−) are used herein as an aid to clarify relative rotations of components within a specific component. In reverser assembly 11A, (+) indicates rotation in the same direction as the primary drive shaft 16 and (−) indicates rotation opposite the direction of the primary drive shaft 16. Face gear (+) 20 is fixedly coupled to the primary drive shaft 16 and rotates whenever the primary drive shaft 16 rotates. Face gear (−) 21 is rotationally coupled to face gear (+) 20 via a pinion gear 22, and therefore rotates in the opposite direction of face gear (+) 20. Pinion gear 22 is mounted to pinion mount 23 via pinion shaft 24. Pinion mount 23 is fixedly coupled to link 3. Face gear (−) 21 is rotationally coupled to reverse drive tube (−) 27 via a drive coupler (−) 26. The face gear (−) 21, drive coupler (−) 26, and reverse drive tube (−) 27 function as an example rotary output from the reverser assembly 11A, but other examples of rotary output configurations are also possible. As illustrated, example reverser assembly 11A is coaxial to primary drive shaft 16, but other configurations are possible in robotic arm system 90. Reverser assembly 11A is also shown as a simplified illustration and other embodiments and/or arrangements may include additional or different components.

Primary drive shaft 16 continues through reverser assembly 11A and is fixedly coupled to drive tube (+) 39 via drive coupler (+) 38. Drive coupler (+) 38 is radially supported by coupler bearing 42, which is fixed to roll actuator mount 32.

Actuator assemblies 11B couple to the drive tube (+) 39 and the reverse drive tube (−) 27 via clutch pack (+) 35 and clutch pack (−) 36, respectively, to transmit rotational torque to the link 3. As illustrated, example actuator assemblies 11B are coaxial to primary drive shaft 16, and are supported with the aid of roll actuator mounts 30 and 32, but other arrangements and configurations are possible in robotic arm system 90.

Clutch pack (+) 35 includes a series of alternating outer clutch plates 35A fixed to roll actuator coupler 31, which in turn is grounded to rotatable portion 3A of link 3. Interleaved between the outer clutch plates 35A are inner clutch plates 35C. Inner clutch plates 35C are fixed to drive tube (+) 39. Friction disks 35B may be further interleaved between the clutch plates 35A and 35B to enhance or modify the characteristics of the clutch pack (+) 35. A bearing surface 41 may serve to stabilize the clutch pack 35 and/or the drive tube 39, and/or function as an environmental seal.

Annular piston (+) 33 serves to engage or disengage the clutch plates 35A and 35B. The annular piston (+) 33 may be hydraulic, pneumatic, air-over-hydraulic, magnetic, or other configurations. When the clutch pack (+) 35 is disengaged, the drive tube (+) 39 freely rotates the inner clutch plates 35C through the outer clutch plates 35A, transferring no significant torque from the primary drive shaft 16 through the clutch pack (+) 35 to the link 3. When the clutch pack (+) 35 is engaged, torque is transmitted from the primary drive shaft 16 through the clutch pack (+) 35 to the rotatable portion 3A of link 3.

Clutch pack (−) 36 is configured, and functions, similarly to clutch pack (+) 35. Clutch pack (−) 36 includes a series of alternating outer clutch plates 36A fixed to roll actuator coupler 31, which in turn is grounded to rotatable portion 3A of link 3. Interleaved between the outer clutch plates 36A are inner clutch plates 36C. Inner clutch plates 36C are fixed to reverse-drive tube (−) 27 via inner plate mount 37. Friction disks 36B may be further interleaved between the clutch plates 36A and 36B to enhance or modify the characteristics of the clutch pack (−) 36. A bearing surface 40 may serve to stabilize the clutch pack 36 and/or the reverse-drive tube (−) 27, and/or function as an environmental seal.

Annular piston (−) 34 serves to engage or disengage the clutch plates 36A and 36C. The annular piston (−) 34 may be hydraulic, pneumatic, air-over-hydraulic, magnetic, or other configurations. When the clutch pack (−) 36 is disengaged, the reverse-drive tube (−) 27 freely rotates the inner clutch plates 36C through the outer clutch plates 36A, transferring no significant torque from the primary drive shaft 16 through the clutch pack (−) 36 to the link 3. When the clutch pack (−) 36 is engaged, torque is transmitted from the primary drive shaft 16, through the reverser assembly 11A, and through the clutch pack (−) 36 to the rotatable portion 3A of link 3.

Figure 4A:
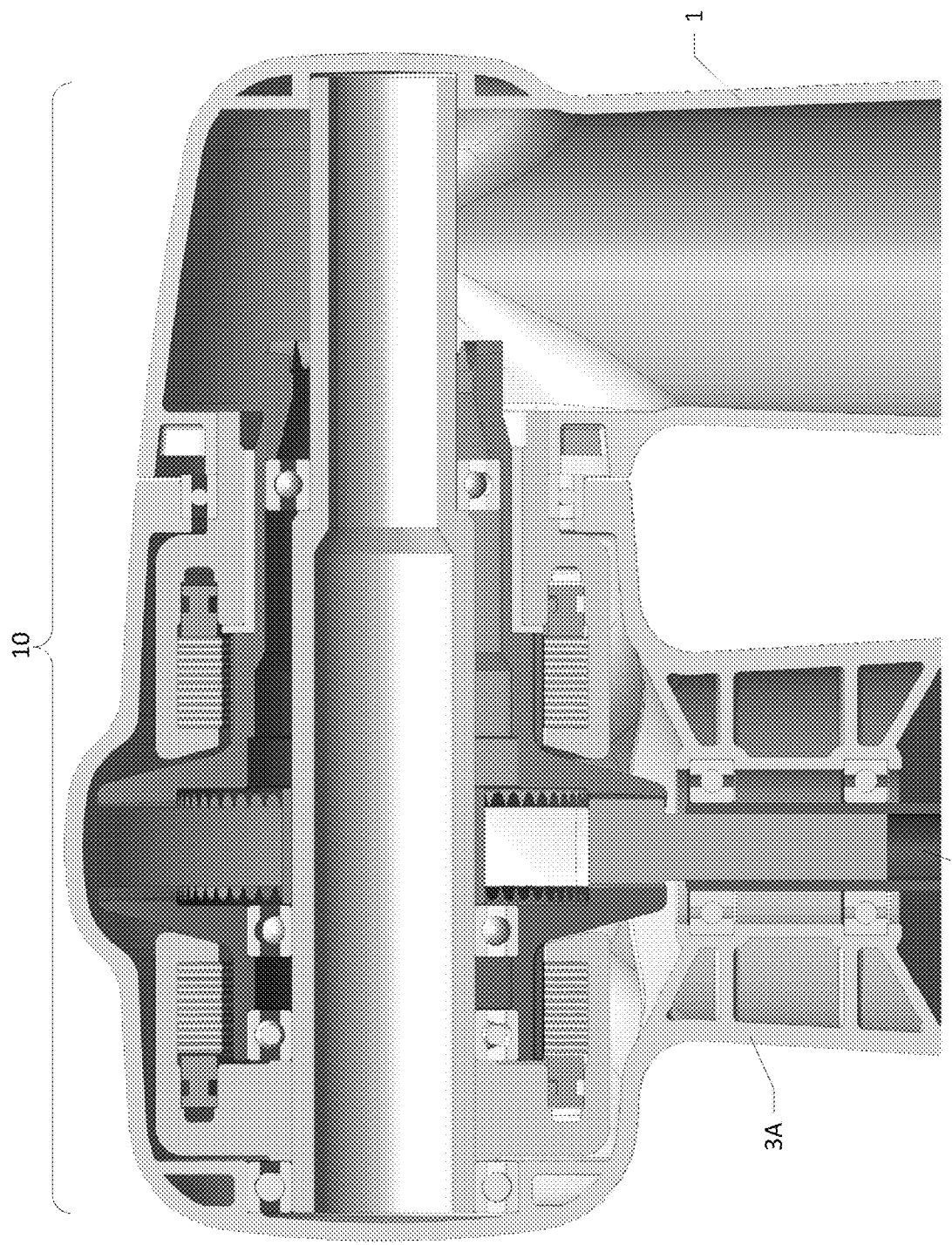
FIG. 4A illustrates a front cutaway detail view of an angle actuator in the example robotic arm system in FIG. 1, according to an example implementation.
Figure 4B:
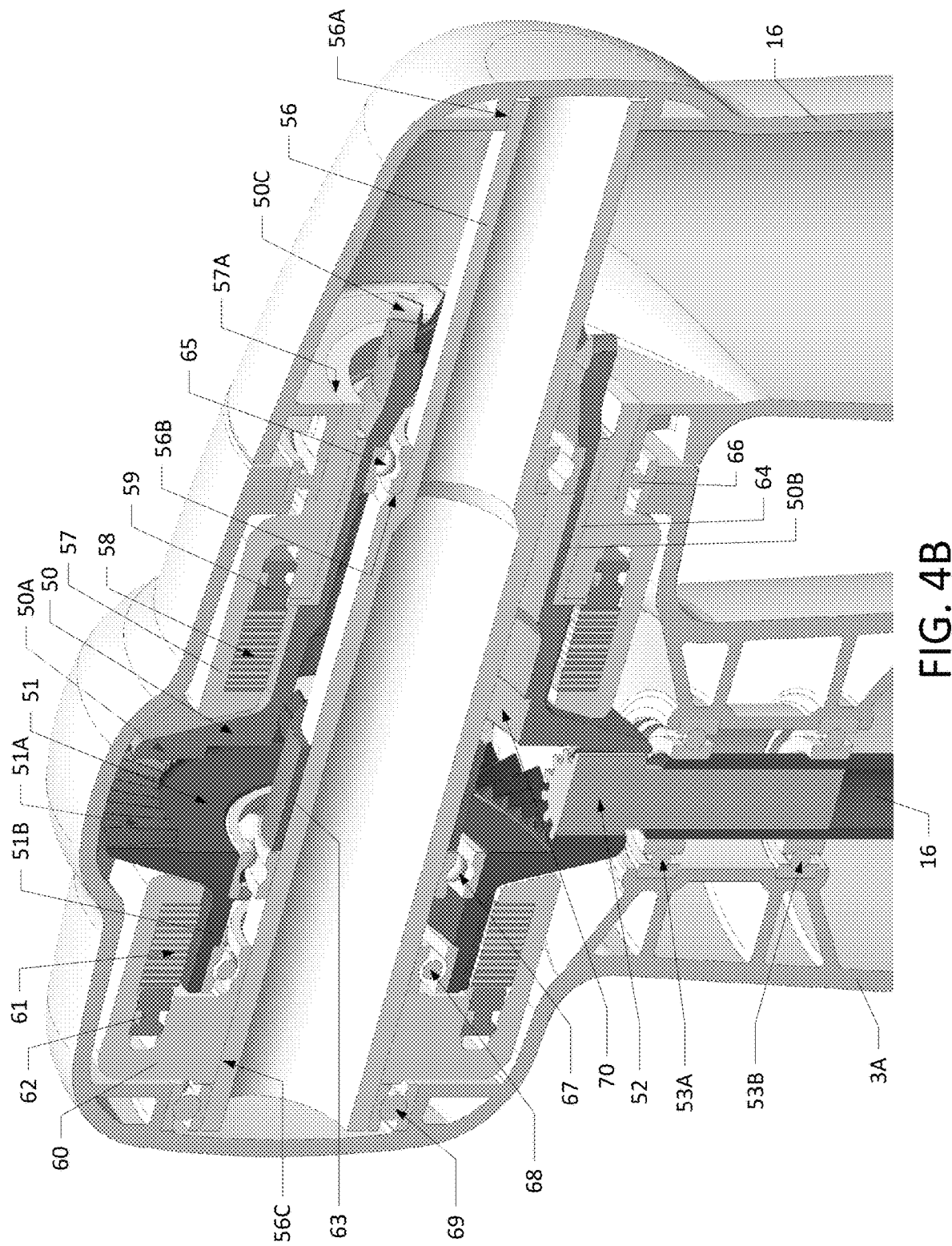
FIG. 4B illustrates a perspective cutaway detail view of the angle actuator in FIG. 4A, according to an example implementation.

FIGS. 4A and 4B illustrate an example angle actuator 10, which may be substantially the same or different than angle actuator 14, and which may be implemented in a robotic arm system, such as robotic arm system 90. Angle actuator 10 includes angle drive (+) 51 that converts rotational torque from the primary drive shaft 16 to rotational torque about a different axis. In the example embodiment shown, the output torque axis 2A is perpendicular to the input torque axis 4A (see FIG. 2 for axis locations). Angle drive (−) 50 works similarly to angle drive (+) 51, but in an opposite rotational direction about torque axis 2A. As above, the designations (+) and (−) are used herein as an aid to clarify relative rotations of components within a specific component, with like signed components having the same rotation, and opposite signed components having opposing rotations. Angle drive (+) 51 includes a face gear (+) 51A and a drive tube (+) 51B. Angle drive (−) 50 similarly includes a face gear (−) 50A and a drive tube (−) 50B, and further includes an additional face gear (−) 50C at the opposite end of the angle drive (−) 50C from the face gear (−) 50A. Face gear (+) 51A and face gear (−) 50A are arranged in opposition to each other and each engage a common pinion gear 52 located at the end of the primary torque shaft 16 and fixed thereto. Accordingly, face gear (+) 51A and face gear (−) 50A counter-rotate as a result of rotation of primary drive shaft 16.

A first actuator assembly includes clutch carrier (+) 60, clutch pack (+) 61, and annular piston (+) 62. Clutch carrier (+) 60 is fixed to torque shaft (+) 56 about interface 56C, and torque shaft 56 is grounded to link 1 about interface 56A. Clutch pack (+) 61 is configured and functions similarly to clutch pack (+) 35, and includes outer clutch plates fixed to the clutch carrier (+) 60 and interleaved inner clutch plates fixed to the drive tube (+) 51B. Friction disks may be further interleaved between the clutch plates to enhance or modify the characteristics of the clutch pack (+) 61. Bearings 67 and 68 may serve to stabilize the clutch pack 61, torque shaft (+) 56, and/or the drive tube 51B, and/or function as an environmental seal. Bearing 69 may also provide stability to torque shaft 56. Torque shaft (+) 56 includes a step 56B to help locate the torque shaft (+) 56 within the angle actuator 10.

Annular piston (+) 62 serves to engage or disengage the clutch plates in clutch pack (+) 61. The annular piston (+) 62 is configured and functions the same or similar to annular piston (+) 33, and may be hydraulic, pneumatic, air-over-hydraulic, magnetic, or other configurations. When the clutch pack (+) 61 is disengaged, the inner clutch plates freely rotate through the outer clutch plates in clutch pack (+) 61, transferring no significant torque from the primary drive shaft 16 through angle drive (+) 51, the clutch pack (+) 61, the clutch carrier (+) 60, the torque shaft 56, and to the link 1 at interface 56A. When the clutch pack (+) 61 is engaged, torque is transmitted from the primary drive shaft 16 to the link 1 via the above route.

A second actuator assembly includes clutch carrier (−) 57, clutch pack (−) 58, and annular piston (−) 59. Clutch carrier (−) 57 is grounded to link 3 about interface 57A. Clutch pack (−) 58 is configured and functions similarly to clutch pack (+) 61, and includes outer clutch plates fixed to the clutch carrier (−) 57 and interleaved inner clutch plates fixed to the drive tube (−) 50B. Friction disks may be further interleaved between the clutch plates to enhance or modify the characteristics of the clutch pack (−) 58. Bearing 65 and bearing surface 64, may serve to stabilize the clutch pack (−) 58, torque shaft (+) 56, clutch carrier (−) 57, and/or the drive tube 50B, and/or function as an environmental seal. An additional bearing at location 70 may be present to further stabilize torque shaft 56 and drive tube (−) 50B, as illustrated in angle actuator 14, but removed in angle actuator 10 for visual clarity of retaining ring 63. Retaining ring 63 serves to help locate the bearing 67 and a bearing at location 70. Seal 66 provides sealing and may further help locate and/or stabilize clutch carrier (−) 57.

Annular piston (−) 59 serves to engage or disengage the clutch plates in clutch pack (−) 58. The annular piston (−) 59 is configured and functions the same or similar to annular piston (+) 62, and may be hydraulic, pneumatic, air-over-hydraulic, magnetic, or other configurations. When the clutch pack (−) 58 is disengaged, the inner clutch plates freely rotate through the outer clutch plates in clutch pack (−) 58, transferring no significant torque from the primary drive shaft 16 through angle drive (−) 50, the clutch pack (−) 58, the clutch carrier (−) 57, and to the link 1 at interface 57A. When the clutch pack (−) 58 is engaged, torque is transmitted from the primary drive shaft 16 to the link 1 via the above route.

Figure 5A:
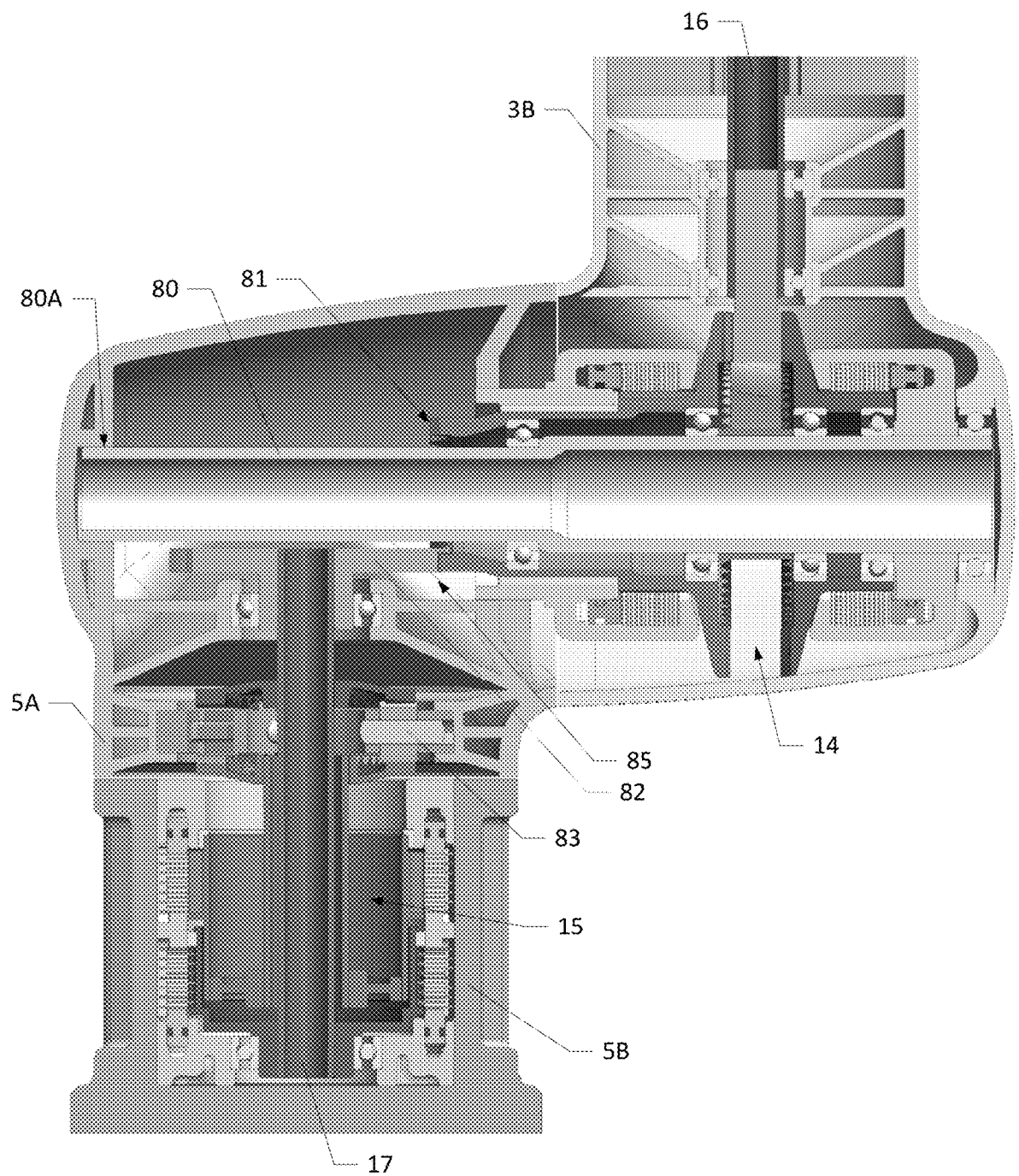
FIG. 5A illustrates a front cutaway detail view of a roll actuator and an angle actuator in the example robotic arm system in FIG. 1, according to an example implementation.
Figure 5B:
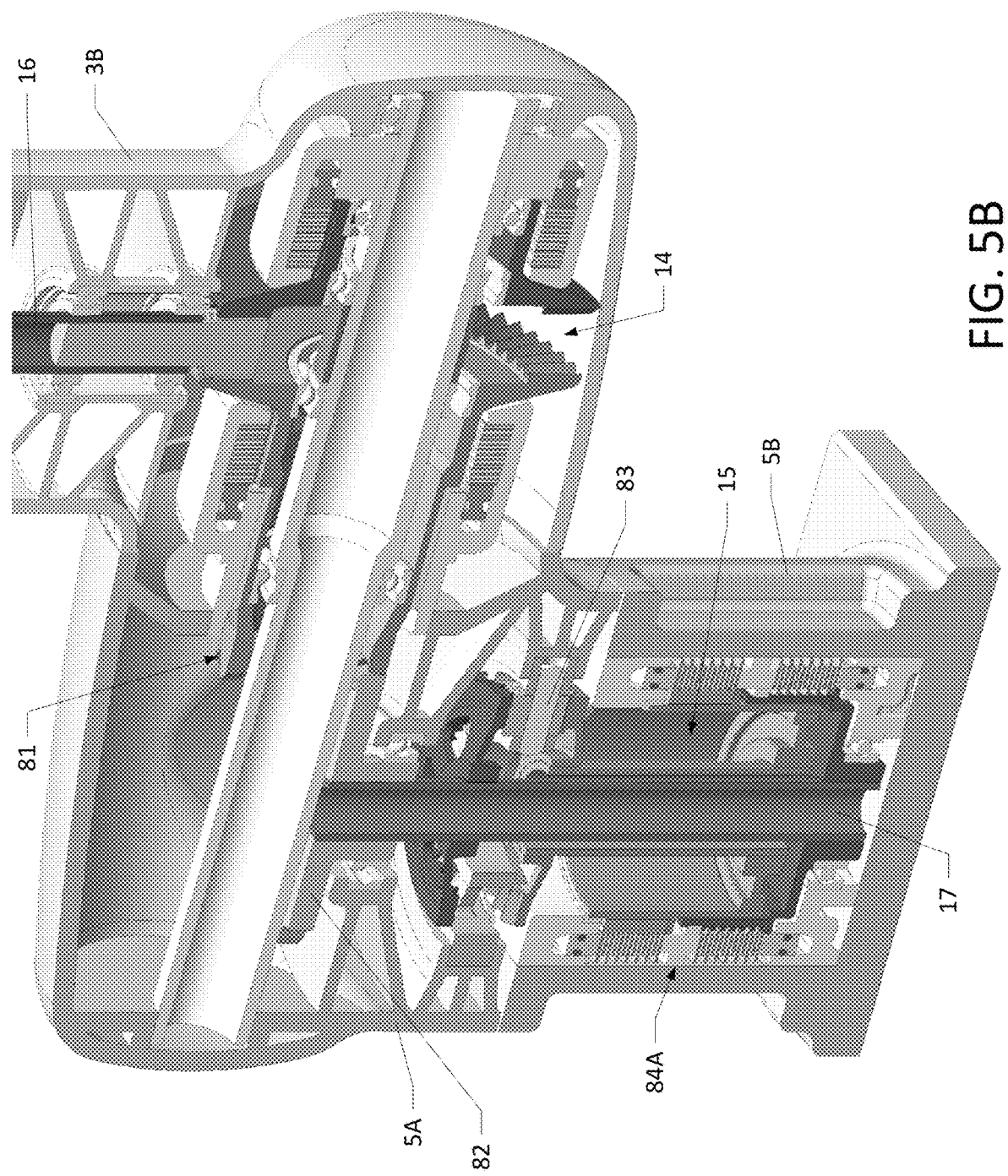
FIG. 5B illustrates a perspective cutaway detail view of the roll actuator and the angle actuator in FIG. 5A, according to an example implementation.

FIGS. 5A and 5B illustrate further additional actuators within robotic arm system 90, including angle actuator 14 and roll actuator 15, each of which functions and/or is configured similarly or identically to other actuators described herein. Of note, roll actuator 15 is grounded to the fixed portion 5B of link 5, but functions the same as in roll actuator 11, i.e., to rotate the rotatable portion 5A in relation to the fixed portion 5B. Also, pinion shaft 83 is illustrated as a different style shaft compared to pinion shaft 24, but functions similarly. Additionally illustrated in FIGS. 5A and 5B are an additional angle drive 85 that transfers torque from primary drive shaft 16 to secondary drive shaft 17 (which may also be referred to as an input or output shaft depending on context and/or arrangement). For angle drive 85, face gear 81 (similar to, or the same as, face gear 50C) engages pinion gear 82 (which may alternatively be referred to as a spur gear due to its large relative size) to rotate secondary drive shaft 17.

V. EXAMPLE OPERATIONS

Figure 7:
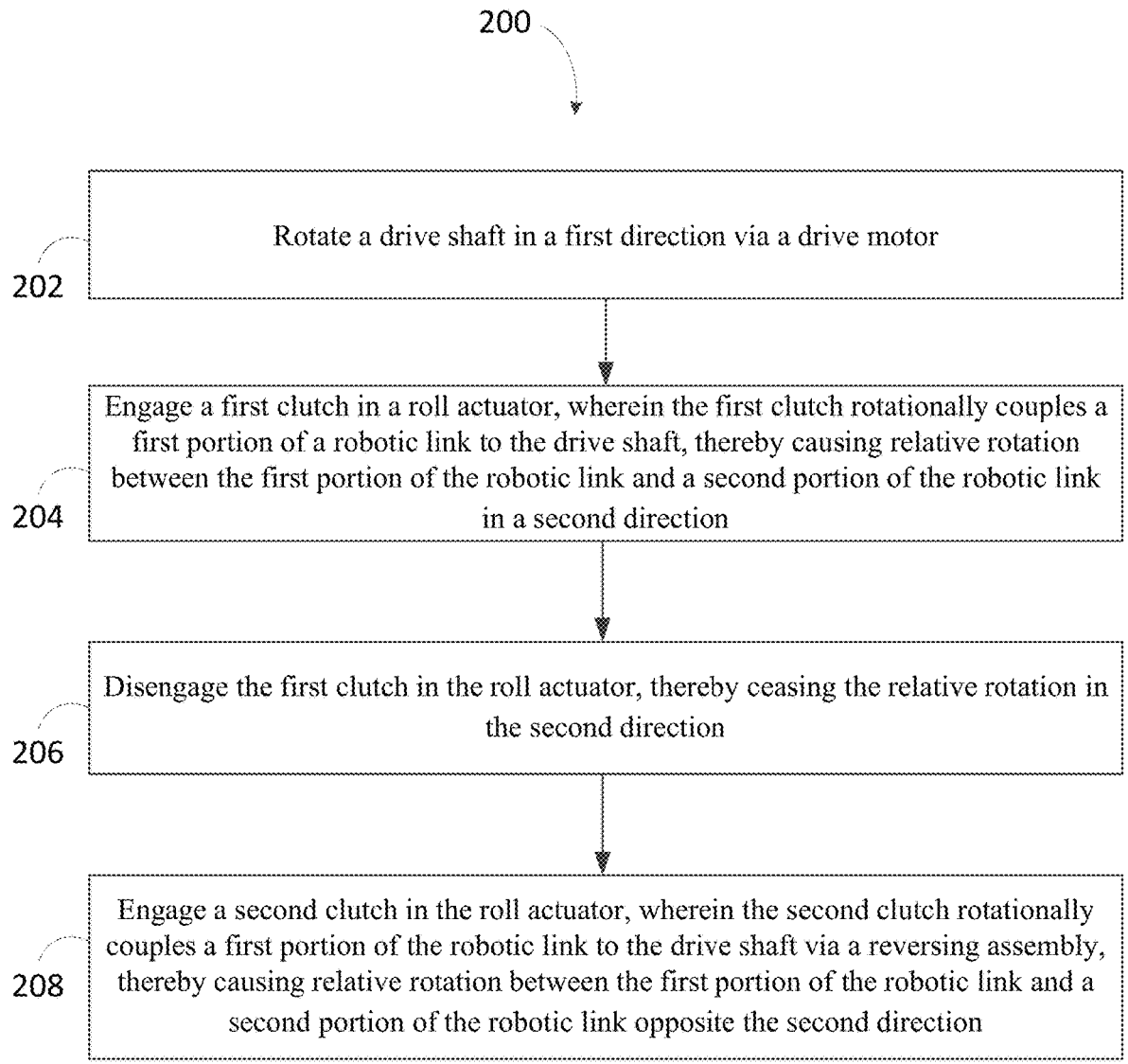
FIG. 7 illustrates an example method of rotating a roll joint, according to an example implementation.

FIG. 7 illustrates a flowchart of an example method 200 of operating a robotic arm roll joint of the present disclosure. This example applies to a robotic arm system such as robotic arm system 90, but may be applied to other robotic arm systems having different arrangements and/or different components than those described herein. Further, method 200 may be carried out by one or more control systems of the robotic system 100 and/or robotic arm system 90. Method 200 is described as being carried out for a single roll actuator, but some or all of the blocks of method 200 may be carried out for two or more roll actuators.

At block 202, method 200 includes rotating a drive shaft in a first direction via a drive motor. For example, in robotic arm system 90, motor 13 may rotate primary drive shaft 16. In another example in robotic arm system 90, motor 13 may rotate secondary drive shaft 17 via primary drive shaft 16, angle actuator 14, and angle drive 85.

At block 204, method 200 includes engaging a first clutch in a roll actuator, wherein the first clutch rotationally couples a first portion of the robotic arm to the drive shaft, thereby causing relative rotation between the first portion of the robotic arm and a second portion of the robotic arm in a second direction. For example, in robotic arm system 90, clutch pack 35 may be engaged, thereby causing rotatable portion 3A to rotate in the second direction, which is the same as the first direction. In another example in robotic arm system 90, a clutch pack in roll actuator 15 may be engaged, thereby causing rotatable portion 5A to rotate in the second direction.

At block 206, method 200 includes disengaging the first clutch in the roll actuator, thereby ceasing the relative rotation in the second direction.

At block 208, method 200 includes engaging a second clutch in the roll actuator, wherein the second clutch rotationally couples a first portion of the robotic link to the drive shaft via a reversing assembly, thereby causing relative rotation between the first portion of the robotic link and a second portion of the robotic link opposite the second direction. For example, in robotic arm system 90, clutch pack 36 may be engaged, thereby causing rotatable portion 3A to rotate opposite the second direction, which is opposite the first direction. In another example in robotic arm system 90, a different clutch pack (relative to the clutch pack described with respect to block 204) in roll actuator 15 may be engaged, thereby causing rotatable portion 5A to rotate opposite the second direction.

Figure 8:
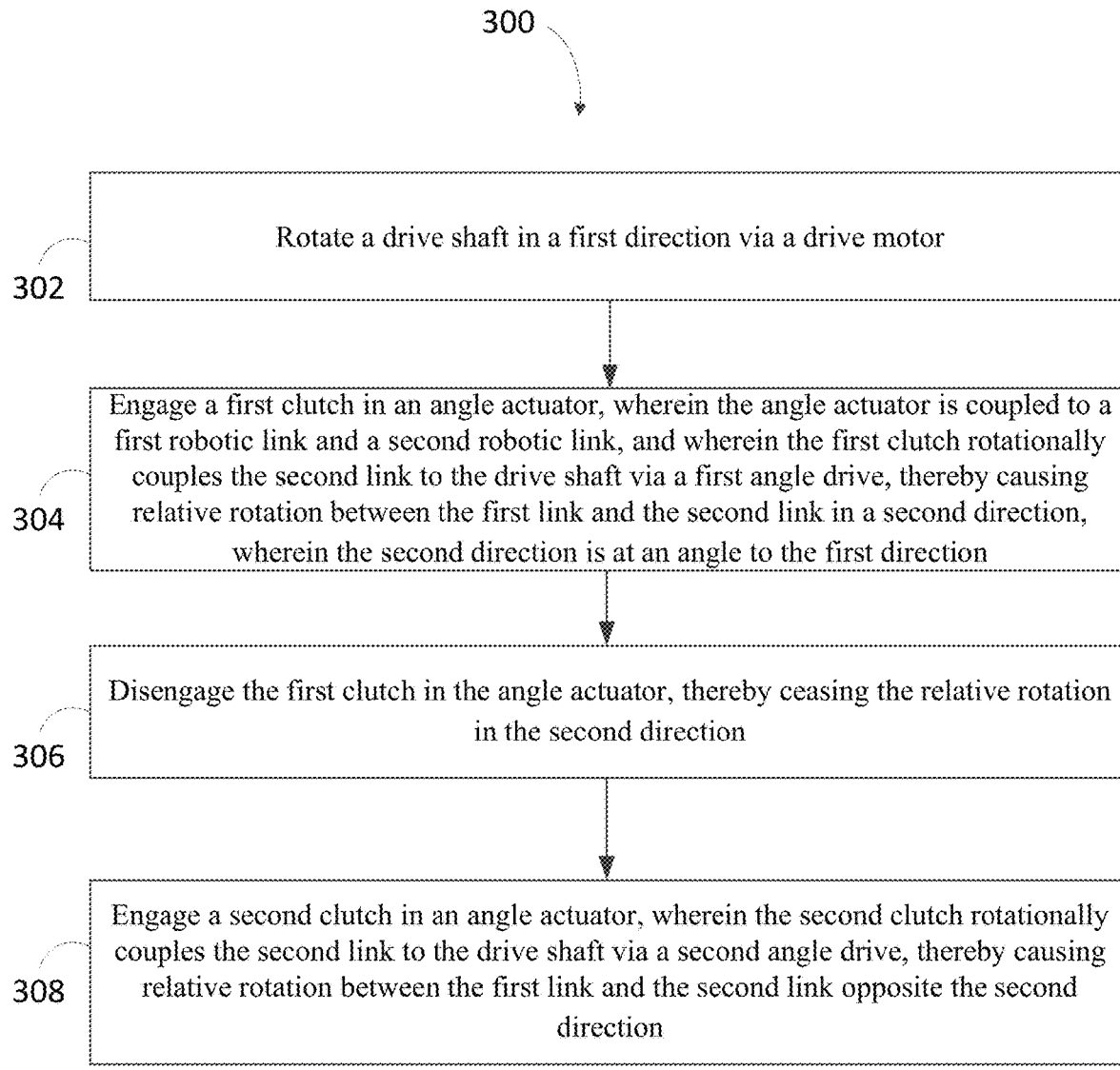
FIG. 8 illustrates an example method of rotating a right-angle joint, according to an example implementation.

FIG. 8 illustrates a flowchart of an example method 300 of operating a robotic right-angle joint of the present disclosure. This example applies to a robotic arm system such as robotic arm system 90, but may be applied to other robotic arm systems having different arrangements and/or different components than those described herein. Further, method 300 may be carried out by one or more control systems of the robotic system 100 and/or robotic arm system 90. Method 300 is described as being carried out for a single angle actuator, but some or all of the blocks of method 300 may be carried out for two or more angle actuators.

At block 302, method 300 includes rotating a drive shaft in a first direction via a drive motor. For example, in robotic arm system 90, motor 13 may rotate primary drive shaft 16. In another example in robotic arm system 90, motor 13 may rotate secondary drive shaft 17 via primary drive shaft 16, angle actuator 14, and angle drive 85.

At block 304, method 300 includes engaging a first clutch in an angle actuator, wherein the angle actuator is coupled to a first robotic link and a second robotic link, and wherein the first clutch rotationally couples the second link to the drive shaft via a first angle drive, thereby causing relative rotation between the first link and the second link in a second direction, wherein the second direction is at an angle to the first direction For example, in robotic arm system 90, clutch pack 61 may be engaged, thereby causing link 1 to rotate in the second direction. In another example in robotic arm system 90, a clutch pack in angle actuator 14 may be engaged, thereby causing link 3 to rotate in the second direction.

At block 306, method 300 includes disengaging the first clutch in the angle actuator, thereby ceasing the relative rotation in the second direction.

At block 308, method 300 includes engaging a second clutch in an angle actuator, wherein the second clutch rotationally couples the second link to the drive shaft via a second angle drive, thereby causing relative rotation between the first link and the second link opposite the second direction. For example, in robotic arm system 90, clutch pack 61 may be engaged, thereby causing link 1 to rotate opposite the second direction. In another example in robotic arm system 90, a clutch pack in angle actuator 14 may be engaged, thereby causing link 3 to rotate opposite the second direction.

VI. EXAMPLE ROBOTIC ARM DEVICE

An example embodiment of the present disclosure may be a robotic arm device including one or more components. The robotic device may include one or more actuators and links, such as those described above. In addition, the example robotic device may include a control system. The control system may include one or more processors, a non-transitory computer-readable memory, and program instructions stored on the non-transitory computer-readable memory executable by the one or more processors to carry out one or more actions. The one or more actions may include the steps described above with respect to methods 200 and 300.

VII. CONCLUSION

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A robotic arm system comprising:
   a base;
   a primary drive shaft comprising a first end and a second end;
   a drive motor coupled to the primary drive shaft, wherein the drive motor is configured to rotate the primary drive shaft in a first direction;
   a first link comprising a first portion and a second portion;
   a first roll actuator coupled to the first link and the primary drive shaft, wherein the first roll actuator is configured to:
   (i) releasably engage the primary drive shaft and, when engaged, rotate the first portion of the first link relative to the base in the first direction, and,
   (ii) releasably engage the primary drive shaft and, when engaged, rotate the first portion of the first link relative to the base in a direction opposite the first direction;
   a second link; and
   a first angular actuator coupled to the first link, the second link, and the first end of the primary drive shaft, wherein the first angular actuator is configured to convert rotational torque from the primary drive shaft to rotational torque about a different axis, and is further configured to:
   (i) releasably engage the primary drive shaft and, when engaged, rotate the second link in a second direction,
   (ii) releasably engage the primary drive shaft and, when engaged, rotate the second link opposite the second direction.

2. The robotic arm system of claim 1, wherein the second direction is perpendicular to the first direction.

3. The robotic arm system of claim 1, wherein the drive motor is coupled to the primary drive shaft via a reduction gearbox.

4. The robotic arm system of claim 3, wherein the reduction gearbox is a planetary gearbox.

5. The robotic arm system of claim 1, wherein the primary drive shaft passes completely through the first roll actuator.

6. The robotic arm system of claim 1, further comprising:
   a secondary drive shaft in the second link; and
   an angular drive, wherein the angular drive is rotatably coupled to the primary drive shaft via the first angular actuator, wherein the angular drive is configured to rotate the secondary drive shaft in a third direction.

7. The robotic arm system of claim 6, wherein the third direction is perpendicular to the second direction.

8. The robotic arm system of claim 6, wherein the second link comprises a respective first portion and a respective second portion, the system further comprising:
   a second roll actuator coupled to the second link and the secondary drive shaft, wherein the second roll actuator is configured to:
   (i) releasably engage the secondary drive shaft and, when engaged, rotate the respective first portion of the second link in the third direction, and,
   (ii) releasably engage the secondary drive shaft and, when engaged, rotate the respective first portion of the second link opposite the direction direction.

9. The robotic arm system of claim 8, further comprising:
   a third link;
   a second angular actuator coupled to the first link, the third link, and the second end of the primary drive shaft, wherein the second angular actuator is configured to:
   (i) releasably engage the primary drive shaft and, when engaged, rotate the third link in a fourth direction, and
   (ii) releasably engage the primary drive shaft and, when engaged, rotate the fourth link opposite the fourth direction.

10. A robotic arm system comprising:
    a base;
    a primary drive shaft;
    a drive motor coupled to the primary drive shaft, wherein the drive motor is configured to rotate the primary drive shaft in a first direction;
    a first link comprising a first portion and a second portion; and
    a roll actuator coupled to the first link and the primary drive shaft, wherein the primary drive shaft passes completely through the roll actuator, and wherein the roll actuator is configured to:
    (i) releasably engage the primary drive shaft and, when engaged, rotate the first portion of the first link relative to the base in the first direction, and,
    (ii) releasably engage the primary drive shaft and, when engaged, rotate the first portion of the first link relative to the base in a direction opposite the first direction.

11. A robotic arm system comprising:
    a primary drive shaft comprising a first end and a second end;
    a drive motor coupled to the primary drive shaft, wherein the drive motor is configured to rotate the primary drive shaft in a first direction;
    a first link;
    a second link; and
    an angular actuator coupled to the first link, the second link, and the first end of the primary drive shaft, wherein the angular actuator is configured to convert rotational torque from the primary drive shaft to rotational torque about a different axis, and is further configured to:
    (i) releasably engage the primary drive shaft and, when engaged, rotate the second link in a second direction, and
    (ii) releasably engage the primary drive shaft and, when engaged, rotate the second link opposite the second direction.

12. The robotic arm system of claim 11, wherein the second direction is perpendicular to the first direction.

13. The robotic arm system of claim 11, further comprising:
    a secondary drive shaft in the second link; and
    an angular drive, wherein the angular drive is rotatably coupled to the primary drive shaft via the angular actuator, wherein the angular drive is configured to rotate the secondary drive shaft in a third direction.

* * * * *